(12) United States Patent
Kishi et al.

(10) Patent No.: US 9,097,170 B2
(45) Date of Patent: Aug. 4, 2015

(54) ENGINE

(75) Inventors: Shinji Kishi, Sakai (JP); Yutaka Noyori, Habikino (JP); Takeshi Kawasaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 354 days.

(21) Appl. No.: 13/421,068

(22) Filed: Mar. 15, 2012

(65) Prior Publication Data
US 2012/0240879 A1 Sep. 27, 2012

(30) Foreign Application Priority Data

Mar. 22, 2011 (JP) .................................. 2011-62017

(51) Int. Cl.
| | |
|---|---|
| *F01P 1/06* | (2006.01) |
| *F01N 3/05* | (2006.01) |
| *F01N 13/10* | (2010.01) |
| *F01P 3/12* | (2006.01) |
| *F01P 7/16* | (2006.01) |
| *F01P 3/20* | (2006.01) |
| *F02B 3/06* | (2006.01) |

(52) U.S. Cl.
CPC . *F01P 1/06* (2013.01); *F01N 3/055* (2013.01); *F01N 13/10* (2013.01); *F01N 2260/20* (2013.01); *F01P 3/12* (2013.01); *F01P 3/20* (2013.01); *F01P 7/165* (2013.01); *F02B 3/06* (2013.01); *Y02T 10/20* (2013.01)

(58) Field of Classification Search
CPC ......... F01P 2060/04; F01P 3/20; F01P 7/165; F01P 3/12; F02B 3/06
USPC ...................................................... 123/41.31
See application file for complete search history.

(56) References Cited

U.S. PATENT DOCUMENTS

| | | | | |
|---|---|---|---|---|
| 4,204,486 A | * | 5/1980 | Nakagawa et al. | 123/41.6 |
| 4,961,403 A | * | 10/1990 | Kawaguchi et al. | 123/2 |
| 5,174,406 A | * | 12/1992 | Lee | 180/68.2 |

(Continued)

FOREIGN PATENT DOCUMENTS

| | | |
|---|---|---|
| JP | 61-32510 | 2/1986 |
| JP | 62-128927 | 8/1987 |

(Continued)

OTHER PUBLICATIONS

Ford Cologne Motor, Wikipedia.*
Japan Office action dated Dec. 17, 2013.

*Primary Examiner* — Lindsay Low
*Assistant Examiner* — Charles Brauch
(74) *Attorney, Agent, or Firm* — Greenblum & Bernstein, P.L.C.

(57) ABSTRACT

An exhaust manifold is covered by a manifold heat shield cover and an exhaust pipe is directed downward from the exhaust manifold. In such an engine, a cooling fan is disposed on a front portion of the engine and the exhaust pipe is positioned on the air flow path of the cooling fan. An auxiliary component heat shielding plate is directed from the manifold heat shield cover along a back side of the exhaust pipe. An auxiliary engine component is disposed beneath the manifold heat shield cover on a back side of the auxiliary component heat shielding plate. Between the exhaust pipe and a cylinder block, an air flow guide plate provides an air flow space between the air flow guide plate and the cylinder block. A cooling air flow passing through the air flow space is thus supplied to the auxiliary engine component.

20 Claims, 9 Drawing Sheets

(56) References Cited

U.S. PATENT DOCUMENTS

| | | | | | |
|---|---|---|---|---|---|
| 5,233,953 | A | * | 8/1993 | Whitehurst et al. | 123/198 E |
| 5,603,297 | A | * | 2/1997 | Wolf et al. | 123/195 C |
| 5,844,177 | A | * | 12/1998 | Pirchl | 181/211 |
| 6,100,599 | A | * | 8/2000 | Kouchi et al. | 290/1 A |
| 2007/0062182 | A1 | * | 3/2007 | Westerbeke, Jr. | 60/321 |
| 2007/0252316 | A1 | * | 11/2007 | Mishima | 267/140.11 |
| 2011/0259012 | A1 | | 10/2011 | Tada et al. | |

FOREIGN PATENT DOCUMENTS

| | | |
|---|---|---|
| JP | 03-129719 | 12/1991 |
| JP | 05-321644 | 12/1993 |
| JP | 2003-237386 | 8/2003 |
| JP | 2005-76605 | 3/2005 |
| JP | 2008-291833 | 12/2008 |

* cited by examiner

ENGINE

CROSS-REFERENCE TO RELATED APPLICATIONS

The present application claims priority under 35 U.S.C. §119 of Japanese Application No. 2011-062017, filed on Mar. 22, 2011, the disclosure of which is expressly incorporated by reference herein in its entirety.

BACKGROUND OF THE INVENTION

1. Field of the Invention

The present invention relates to an engine, and more specifically relates to an engine capable of easing a thermal load on an auxiliary engine component disposed adjacent to an exhaust pipe.

2. Description of Related Art

In a conventional engine, an exhaust manifold is covered with a manifold heat shield cover and an exhaust pipe is directed downward from the exhaust manifold (see, e.g., Related Art 1). With this kind of engine, there is an advantage that a thermal load on an auxiliary component in the vicinity of the exhaust manifold may be reduced. However, a negative circumstance arises because the conventional art does not perform heat shielding on the exhaust pipe.

[Related Art 1] Japanese Patent Laid-open Publication No. 2005-76605

SUMMARY OF THE INVENTION

A thermal load on an auxiliary engine component disposed adjacent to an exhaust pipe increases because heat shielding is not performed on an exhaust pipe.

An advantage of the present invention is to provide an engine capable of easing a thermal load on an auxiliary engine component disposed adjacent to an exhaust pipe.

Characteristic elements of the invention are as follows. As exemplified in FIGS. 1 and 2, an exhaust manifold 1 is covered by a manifold heat shield cover 2 and an exhaust pipe 3 is directed downward from the exhaust manifold 1. In such an engine, as exemplified in FIG. 3, a cooling fan 4 is disposed on a front portion of the engine and the exhaust pipe 3 is positioned on the air flow path of the cooling fan 4. As exemplified in FIGS. 1 and 2, an auxiliary component heat shielding plate 5 is directed from the manifold heat shield cover 2 along a back side of the exhaust pipe 3. An auxiliary engine component 6 is disposed beneath the manifold heat shield cover 2 on a back side of the auxiliary component heat shielding plate 5. Between the exhaust pipe 3 and a cylinder block 7, an air flow guide plate 8 is positioned so as to provide an air flow space 9 between the air flow guide plate 8 and the cylinder block 7. A cooling air flow 10 passing through the air flow space 9 is thus supplied to the auxiliary engine component 6.

The invention achieves the following result. The thermal load on an auxiliary engine component disposed adjacent to the exhaust pipe may be eased. As exemplified in FIG. 1, the temperature of the exhaust pipe 3 is lowered by the cooling air flow 10, and in addition, the heat released from the exhaust pipe 3 to the auxiliary engine component 6 is blocked by the auxiliary component heat shielding plate 5. The heat released from the exhaust manifold 1 to the auxiliary engine component 6 is blocked by the manifold heat shield cover 2. Also, the auxiliary engine component 6 is air-cooled by the cooling air flow 10. Accordingly, the thermal load on the auxiliary engine component 6 disposed adjacent to the exhaust pipe 3 may be eased.

Further, the invention achieves the result that reduction of the thermal load on the auxiliary engine component 6 is large. As exemplified in FIG. 2, the air flow guide plate 8 is directed from the endmost portion 11 of the auxiliary component heat shielding plate 5 on the cylinder block 7 side along a peripheral wall of the exhaust pipe 3. The flow of heated exhaust air from the exhaust pipe 3 is thus interrupted by the auxiliary component heat shielding plate 5 and the air flow guide plate 8, and so does not flow into the auxiliary engine component 6 side. Reduction of the thermal load on the auxiliary engine component 6 is therefore large.

In addition, the invention achieves the result that reduction of the thermal load on the auxiliary engine component 6 is large. As exemplified in FIG. 2, a front portion 12 of the air flow guide plate 8 is inclined in a direction away from the cylinder block 7 on the front side of the exhaust pipe 3. The entrance 13 to the air flow space 9 is thus widened and the amount of the cooling air flow 10 toward the auxiliary engine component 6 side therefore increases. Reduction of the thermal load on the auxiliary engine component 6 is therefore large.

In addition, the invention achieves the result that reduction of the thermal load on the auxiliary engine component 6 is large. As exemplified in FIG. 4, an insulating material 15 is accommodated between the exhaust manifold 1 and a lower wall 14 of the manifold heat shield cover 2. Therefore, the heat released from the exhaust manifold 1 to the auxiliary engine component 6 is blocked by the insulating material 15, as well as by the lower wall 14 of the manifold heat shield cover 2. Reduction of the thermal load on the auxiliary engine component 6 is therefore large.

In addition, the invention achieves the result that an engine is unlikely to fail to start. As exemplified in FIG. 1, the auxiliary engine component 6 is a starter motor 16. Therefore, thermal damage to the starter motor 16 is inhibited and the engine is unlikely to fail to start.

In addition, the invention achieves the result that the thermal load on a gasket of a cylinder head cover may be reduced. As exemplified in FIGS. 8 and 9, a gasket 18 is disposed between a cylinder head 17 and the exhaust manifold 1, the gasket 18 provided with a gasket extension portion 19 extending out from between the surrounding elements. The gasket extension portion 19 is positioned between the exhaust manifold 1 and a cylinder head cover 20. Therefore, the gasket extension portion 19 blocks the heat released from the exhaust manifold 1 to the cylinder head cover 20 and the thermal load on a gasket 34 of the cylinder head cover 20 may be reduced.

In addition, the invention achieves the result that reduction of the thermal load on the gasket 34 of the cylinder head cover 20 is large. As exemplified in FIGS. 8 and 9, a bent portion 21 is provided on the gasket extension portion 19 bending away from the cylinder head cover 20. The bent portion 21 overlaps with an end portion 23 of an upper wall 22 of the manifold heat shield cover 2 on the cylinder head cover 20 side. Therefore, the heat released from the exhaust manifold 1 to the cylinder head cover 20 is blocked by two layers of walls, composed from the bent portion 21 of the gasket extension portion 19 and from the end portion 23 of the upper wall 22 of the manifold heat shield cover 2 on the cylinder head cover 20 side. Reduction of the thermal load on the gasket 34 of the cylinder head cover 20 is therefore large.

In addition, the invention achieves the result that reduction of the thermal load on the gasket 34 of the cylinder head cover 20 is large. As exemplified in FIG. 8, the bent portion 21 of the gasket extension portion 19 overlaps from above with the end portion 23 of the upper wall 22 of the manifold heat shield cover 2 on the cylinder head cover 20 side. Therefore, even in a case where a space has been made between the bent portion 21 of the gasket extension portion 19 and the end portion 23 on the cylinder head cover 20 side, the opening of the space faces a side opposite to the cylinder head cover 20 and the internal space of the manifold heat shield cover 2 will never face the cylinder head cover 20. Reduction of the thermal load on the gasket 34 of the cylinder head cover 20 is therefore large.

In addition, the invention achieves the result that debris and the like is unlikely to accumulate between the bent portion 21 of the gasket extension portion 19 and the end portion 23 on the cylinder head cover 20 side. As exemplified in FIG. 9, the bent portion 21 of the gasket extension portion 19 overlaps from below with the end portion 23 of the upper wall 22 of the manifold heat shield cover 2 on the cylinder head cover 20 side. Therefore, even in a case where a space has been made between the bent portion 21 of the gasket extension portion 19 and the end portion 23 on the cylinder head cover 20 side, the opening of the space faces the interior of the manifold heat shield cover 2 and the cylinder head cover 20 side. Debris and the like is therefore unlikely to accumulate in the space.

In addition, the invention achieves the result that easing of a thermal load on the auxiliary engine component 6 disposed adjacent to the exhaust pipe 3 is large. As exemplified in FIGS. 8 and 9, an air flow space 24 is provided between the exhaust manifold 1 and the manifold heat shield cover 2 such that the exhaust manifold 1 is cooled by the cooling air flow passing through the air flow space 24. The temperature of the exhaust manifold 1 is thus lowered by the cooling air flow and the heat released from the exhaust manifold 1 to the auxiliary engine component 6 is eased. Easing of a thermal load on the auxiliary engine component 6 disposed adjacent to the exhaust pipe 3 is therefore large.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

FIGS. 1-9 describe an engine according to an embodiment of the present invention. A water-cooled vertical multi-cylinder diesel engine will be described in the embodiment.

Figure 4:
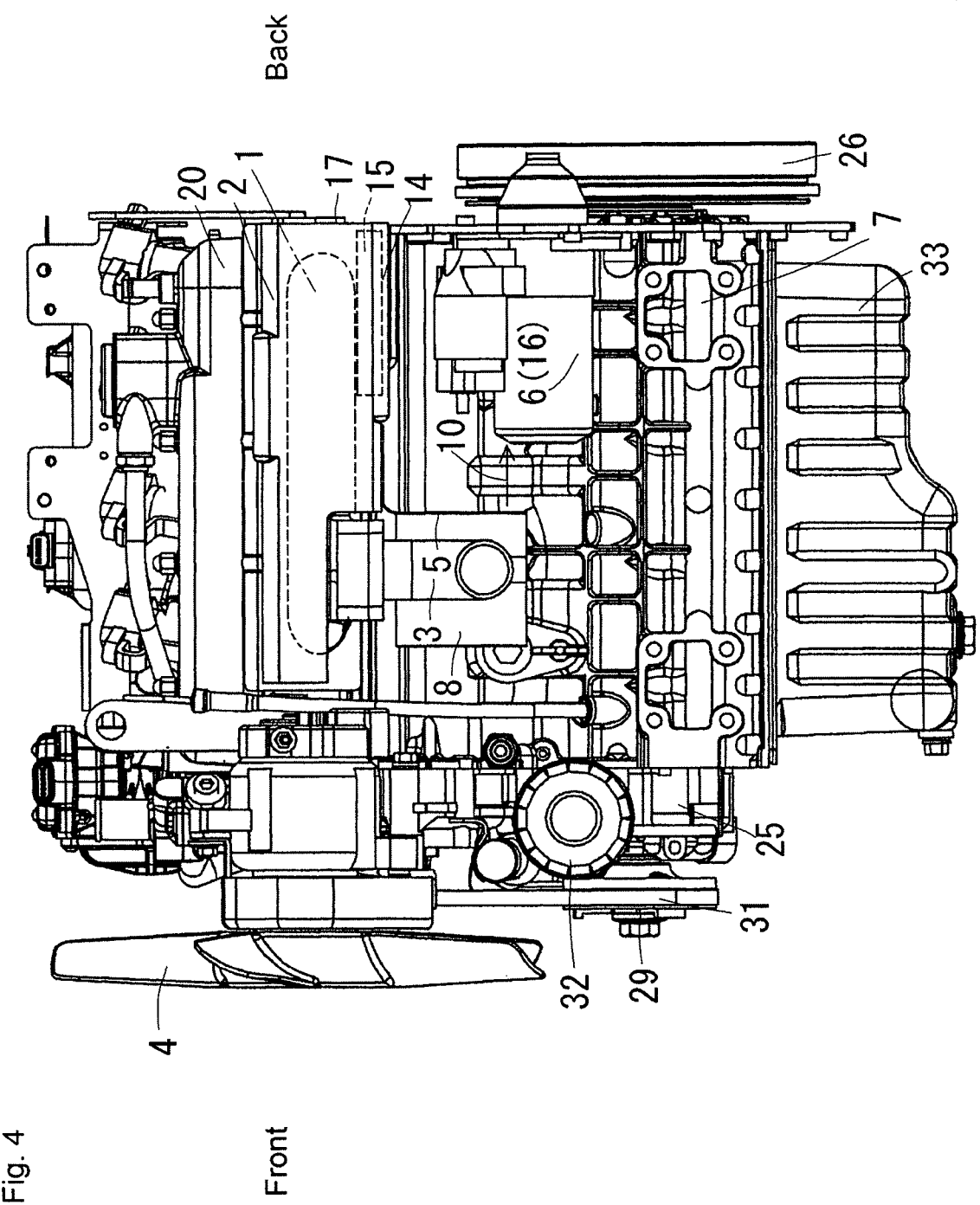
FIG. 4 is a side view of the engine in FIG. 1.
Figure 5:
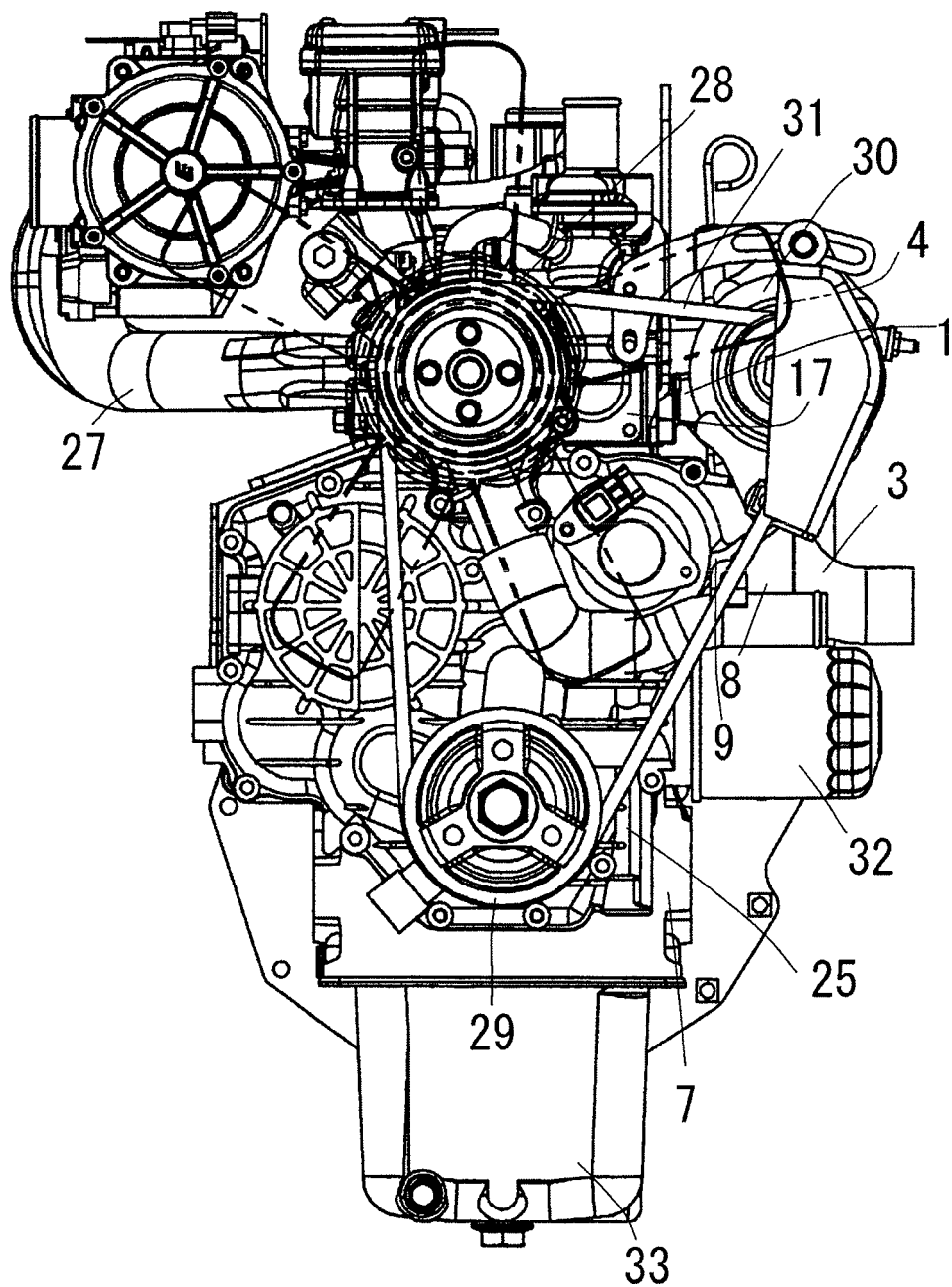
FIG. 5 is a front elevation view of the engine in FIG. 1.
Figure 6:
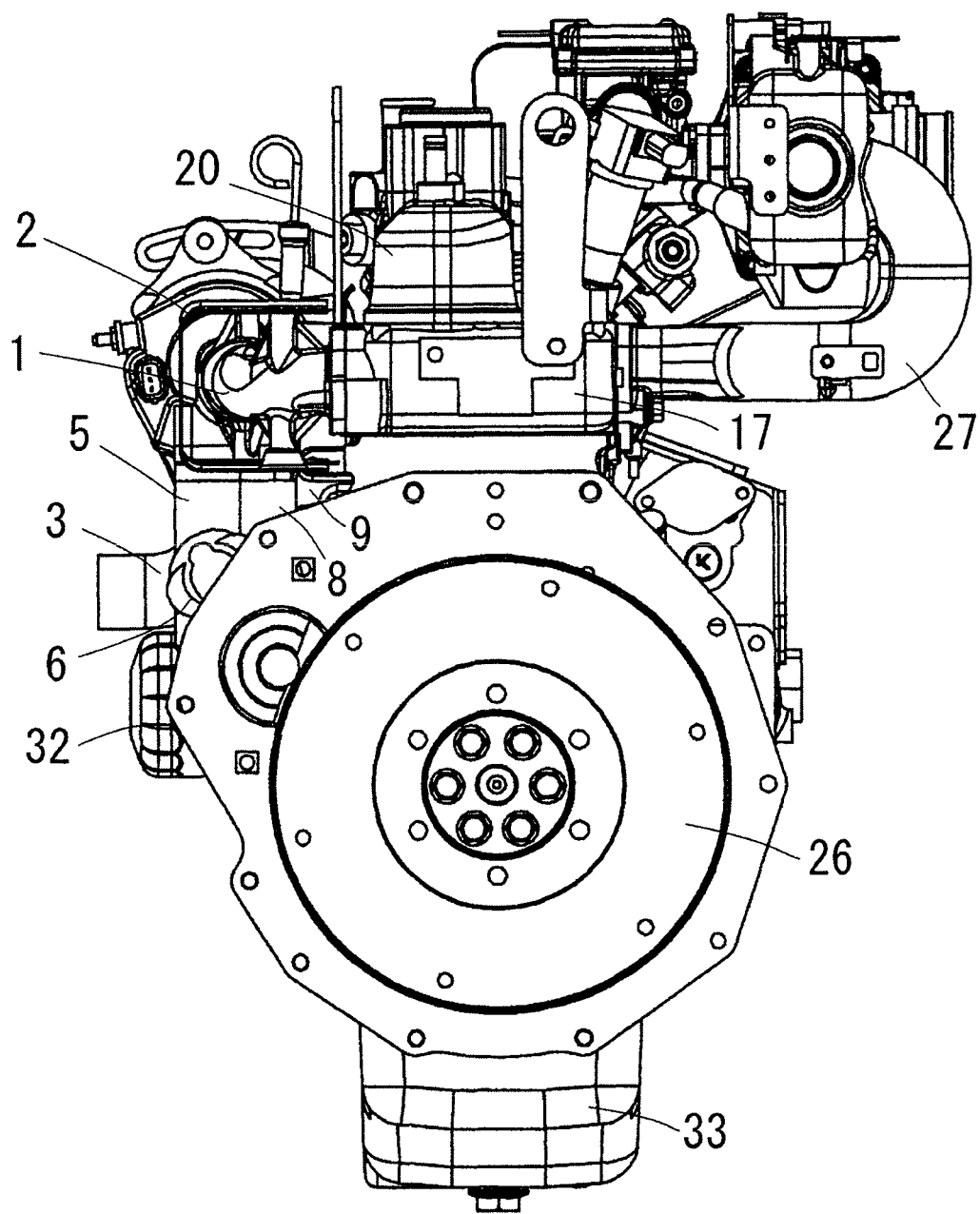
FIG. 6 is a rear elevation view of the engine in FIG. 1.
Figure 7:
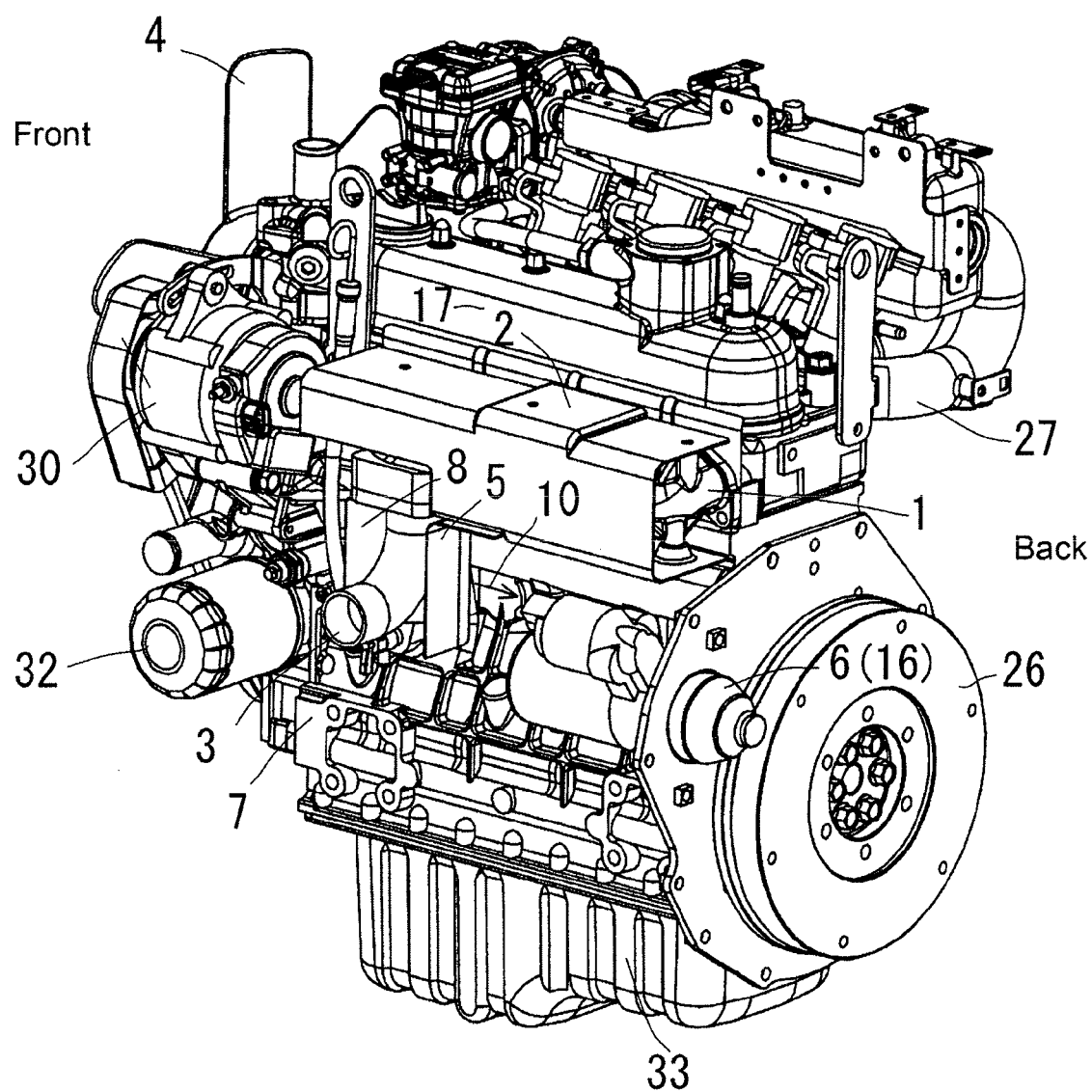
FIG. 7 is a perspective view of the engine in FIG. 1.

The summary of the engine is as follows. With reference to FIG. 4, the cylinder head 17 is attached to an upper portion of the cylinder block 7. The cylinder head cover 20 is attached to an upper portion of the cylinder head 17. A transmission timing gear case 25 is attached to a front portion of the cylinder block 7. The cooling fan 4 is provided on this front portion. A flywheel 26 is provided on a rear portion of the cylinder block 7. With reference to FIGS. 5 and 6, an intake manifold 27 is attached to one side of the cylinder head 17. An exhaust manifold 1 is attached to the other side. As shown in FIG. 5, the cooling fan 4 is driven by a fan pulley 28, a crank pulley 29, and a fan belt 31 wound around a belt tensioner 30. An oil filter 32 is mounted to the transmission timing gear case 25. An oil pan 33 is attached to a bottom portion of the cylinder block 17.

Figure 1:
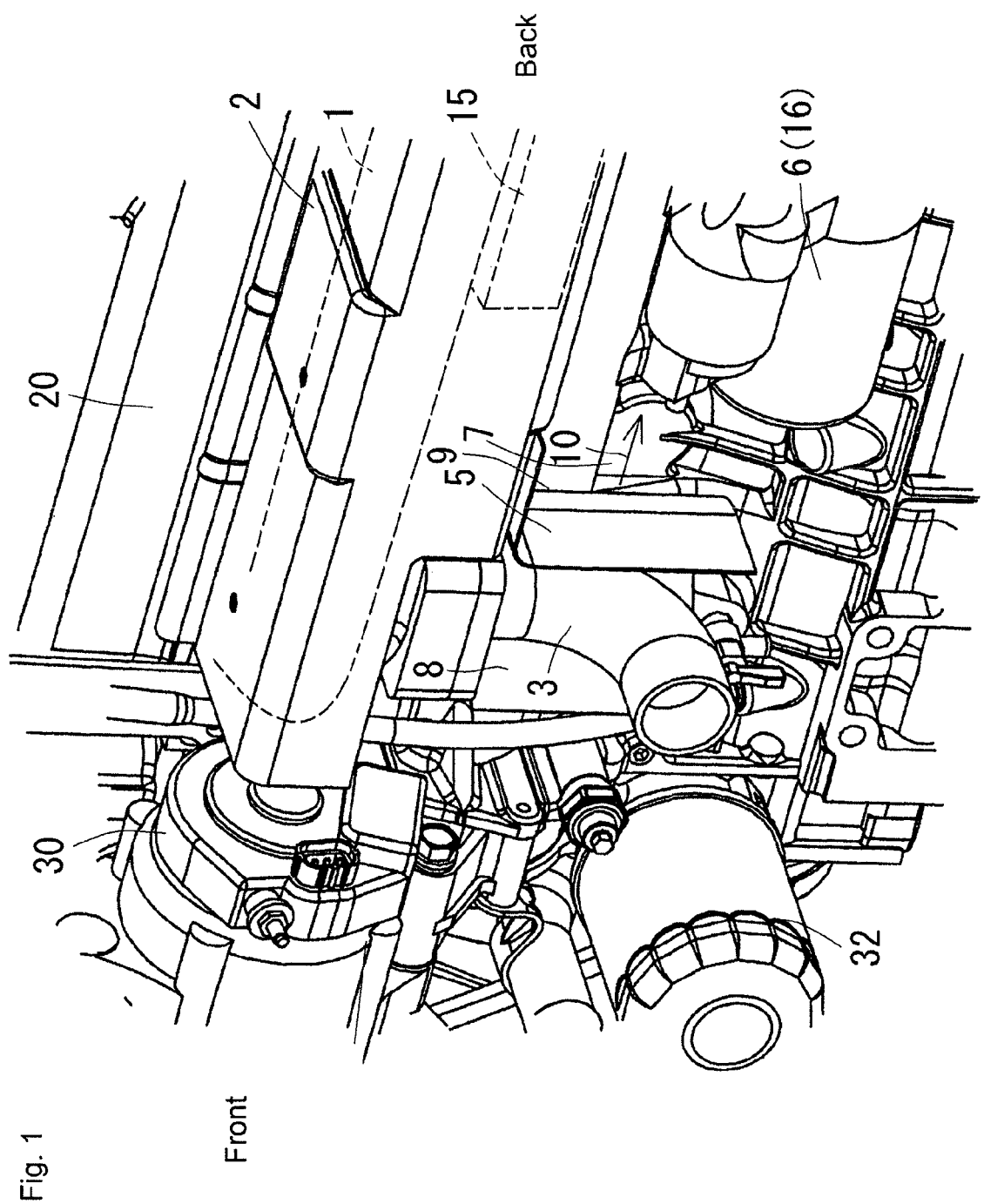
FIG. 1 is a perspective view of a relevant portion of an engine according to an embodiment of the present invention.
Figure 2:
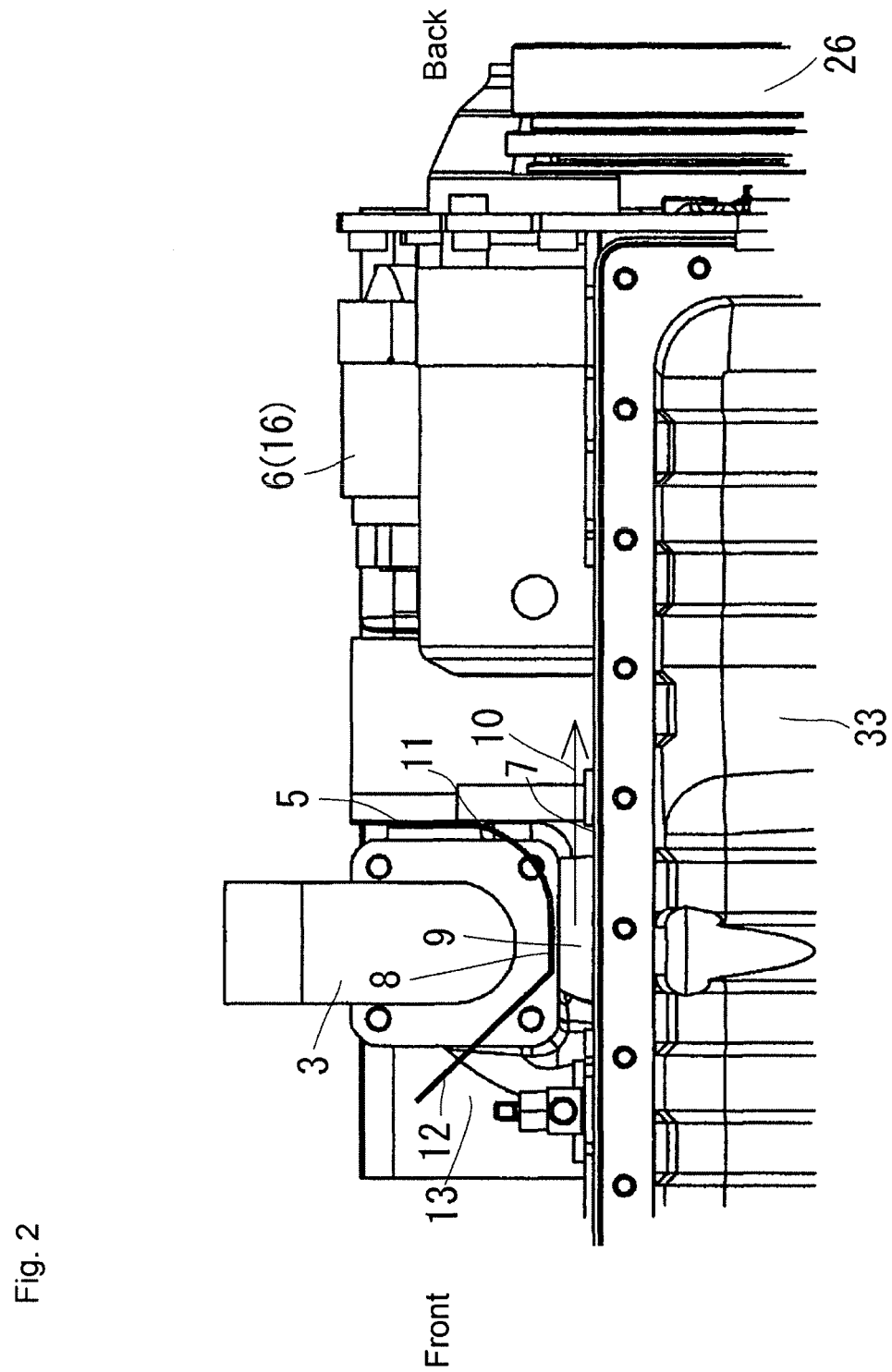
FIG. 2 is a base view of a relevant portion of the engine in FIG. 1.
Figure 3:
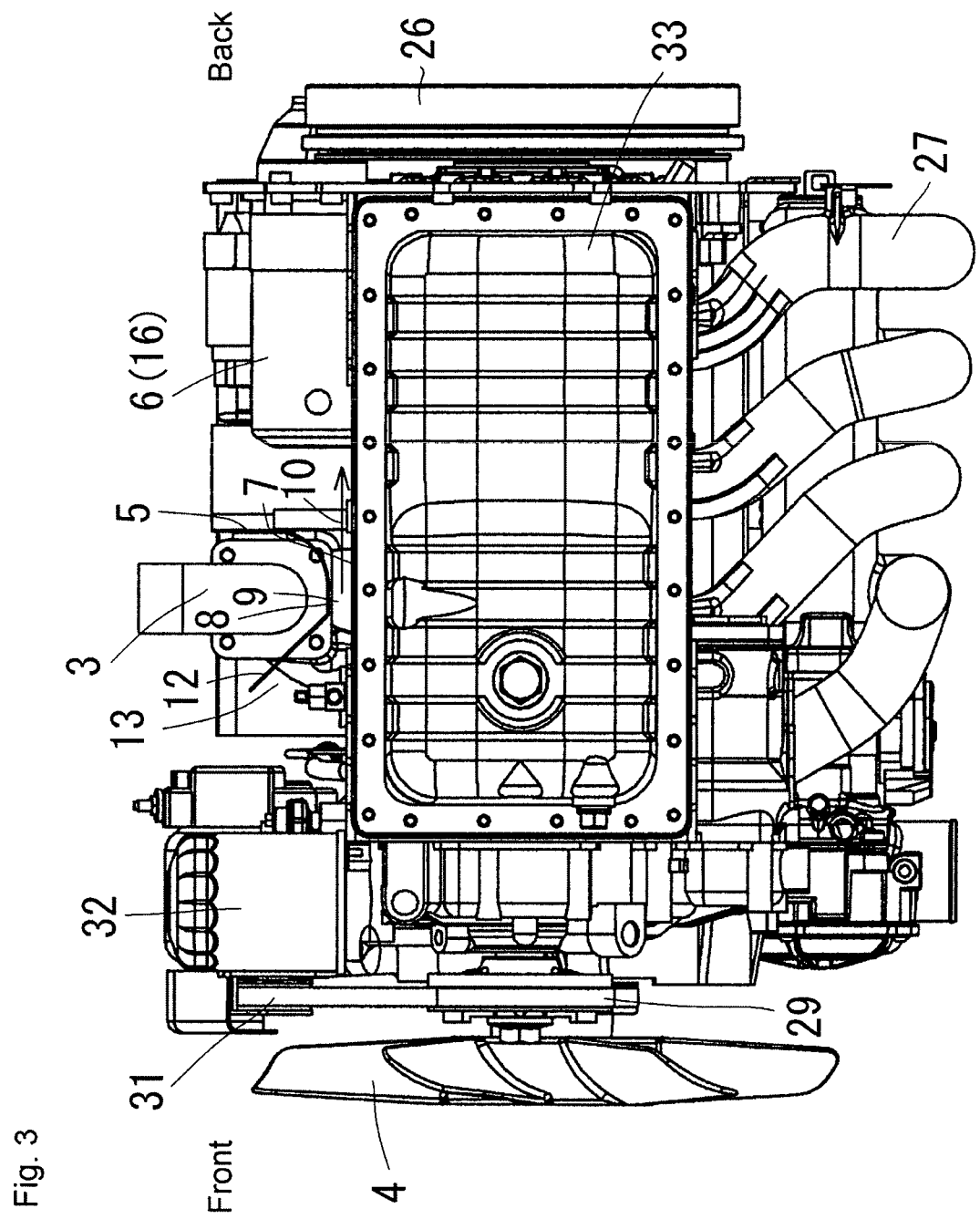
FIG. 3 is a base view of the engine in FIG. 1.

As shown in FIGS. 1 and 2, the exhaust manifold 1 is covered by the manifold heat shield cover 2 and the exhaust pipe 3 is directed downward from the exhaust manifold 1. As shown in FIG. 3, the cooling fan 4 is disposed on a front portion of the engine. The exhaust pipe 3 is positioned on an air flow path of the cooling fan 4. As shown in FIGS. 1 and 2, the auxiliary component heat shielding plate 5 is directed from the manifold heat shield cover 2 along a back side of the exhaust pipe 3. The auxiliary engine component 6 is disposed beneath the manifold heat shield cover 2 on a back side of the auxiliary component heat shielding plate 5. Between the exhaust pipe 3 and the cylinder block 7, the air flow guide plate 8 is disposed so as to provide the air flow space 9 between the air flow guide plate 8 and the cylinder block 7. The cooling air flow 10 passing through the air flow space 9 is thus supplied to the auxiliary engine component 6.

As shown in FIG. 2, the air flow guide plate 8 is directed from the endmost portion 11 of the auxiliary component heat shielding plate 5 on the cylinder block 7 side along a peripheral wall of the exhaust pipe 3. As shown in FIG. 2, the front portion 12 of the air flow guide plate 8 is inclined in a direction away from the cylinder block 7 on the front side of the exhaust pipe 3. The entrance 13 to the air flow space 9 is thus widened. As shown in FIG. 4, the insulating material 15 is accommodated between the exhaust manifold 1 and the lower wall 14 of the manifold heat shield cover 2. The insulating material 15 is fiberglass accommodated in a box of punched metal. As shown in FIG. 4, the auxiliary engine component 6 is the starter motor 16.

Figure 8:
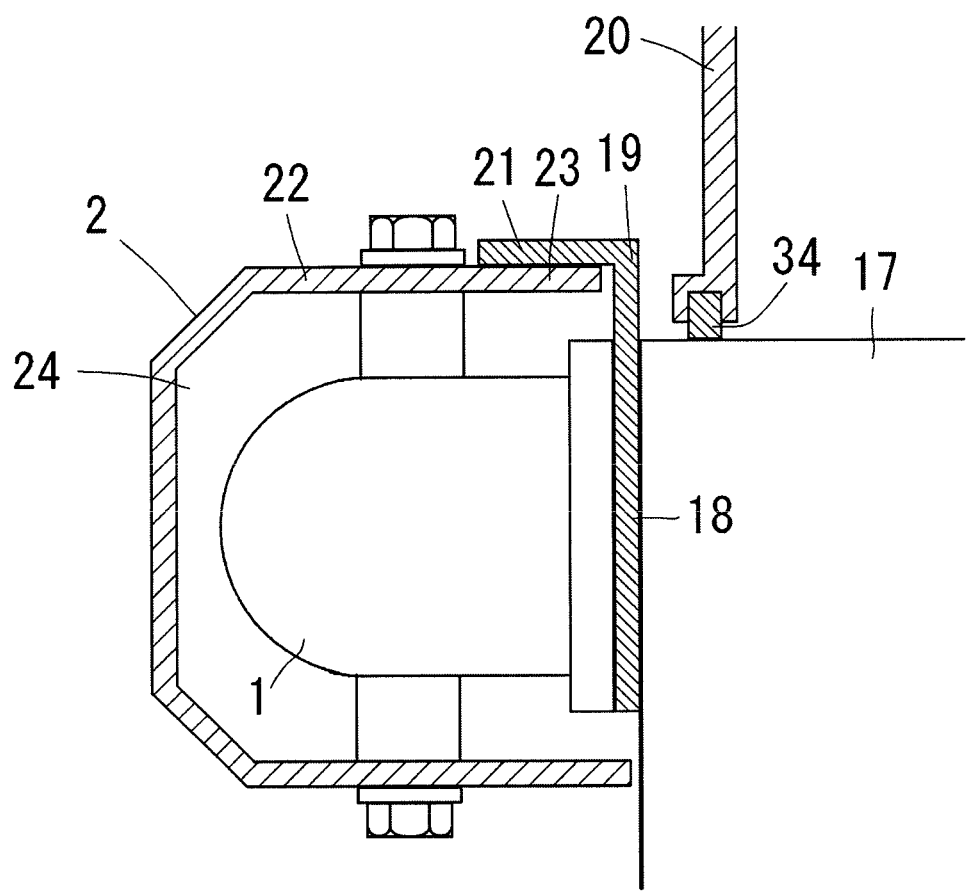
FIG. 8 is a rear elevation view of an exhaust manifold and its surrounding components in the engine in FIG. 1.

As shown in FIG. 8, the gasket 18 is disposed between the cylinder head 17 and the exhaust manifold 1. The gasket extension portion 19 is provided to the gasket 18 extending out from between the surrounding elements. The gasket extension portion 19 is positioned between the exhaust manifold 1 and the cylinder head cover 20. As shown in FIG. 8, the bent portion 21 is provided on the gasket extension portion 19 bending away from the cylinder head cover 20. The bent portion 21 overlaps with an end portion 23 of the upper wall 22 of the manifold heat shield cover 2 on a cylinder head cover 20 side. As shown in FIG. 8, the bent portion 21 of the gasket extension portion 19 overlaps from above with the end portion 23 of the upper wall 22 of the manifold heat shield cover 2 on the cylinder head cover 20 side. The air flow space 24 is provided between the exhaust manifold 1 and the manifold heat shield cover 2 such that the exhaust manifold 1 is cooled by the cooling air flow passing through the air flow space 24.

Figure 9:
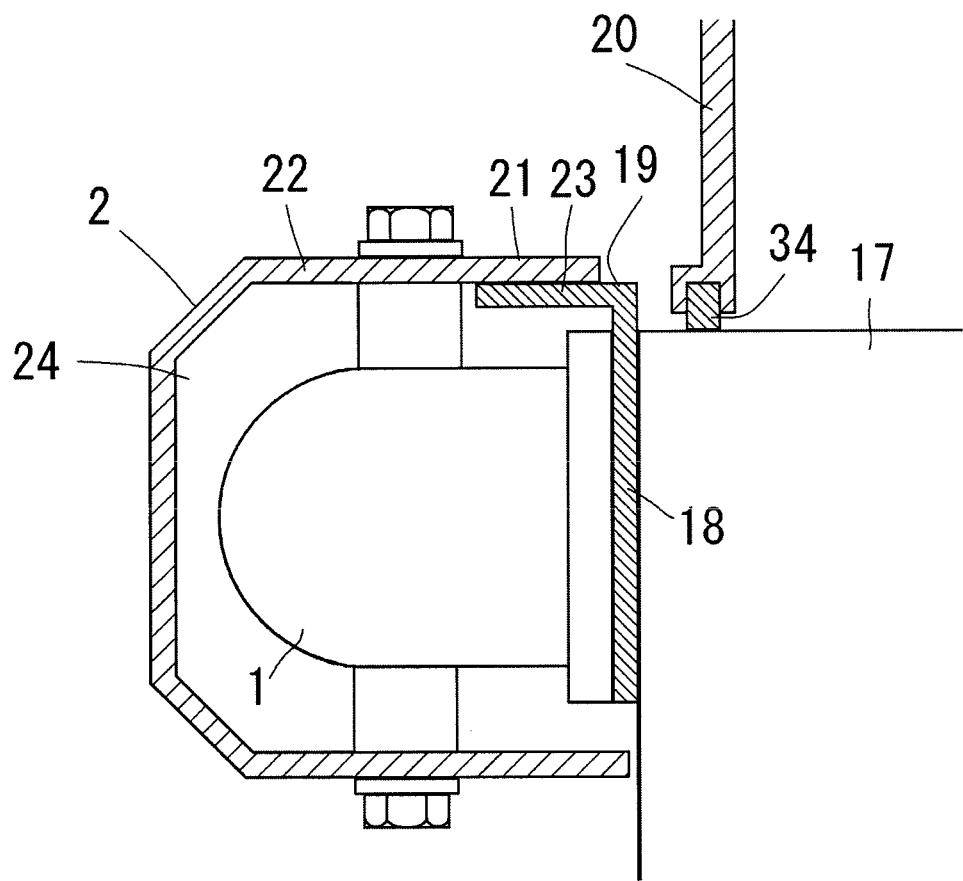
FIG. 9 is a descriptive view of an alternate example of a manifold heat shield cover employed in the engine in FIG. 1.

An alternate example of the manifold heat shield cover 2 is shown in FIG. 9, wherein the bent portion 21 of the gasket extension portion 19 overlaps from below with the end portion 23 of the upper wall 22 of the manifold heat shield cover 2 on the cylinder head cover 20 side. The other components are the same as those shown in FIG. 8 and thus identical reference numbers are applied to identical elements in FIGS. 8 and 9.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An engine having an exhaust manifold covered by a manifold heat shield cover and an exhaust pipe directed downward from the exhaust manifold, the engine comprising:
 a cooling fan disposed on a front portion of the engine and having an airflow path on which the exhaust pipe is disposed;
 an auxiliary component heat shielding plate extending down from the manifold heat shield cover along a back side of and adjacent the exhaust pipe;
 an auxiliary engine component disposed beneath the manifold heat shield cover and having a front side that is spaced from a back side of the auxiliary component heat shielding plate; and
 an air flow guide plate positioned between the exhaust pipe and a cylinder block so as to provide an air flow space between the air flow guide plate and the cylinder block, wherein a cooling air flow passing through the air flow space is supplied to the auxiliary engine component.

2. The engine according to claim 1, wherein the air flow guide plate is directed from an endmost portion of the auxiliary component heat shielding plate on the cylinder block side along a peripheral wall of the exhaust pipe.

3. The engine according to claim 1, wherein a front portion of the air flow guide plate is inclined in a direction away from the cylinder block on the front side of the exhaust pipe, thereby widening an entrance to the air flow space.

4. The engine according to claim 1, wherein an insulating material is accommodated between the exhaust manifold and a lower wall of the manifold heat shield cover.

5. The engine according to claim 1, wherein the auxiliary engine component is a starter motor.

6. The engine according to claim 1, wherein a gasket is disposed between a cylinder head and the exhaust manifold, the gasket being provided with a gasket extension portion extending out from between surrounding elements, the gasket extension portion being positioned between the exhaust manifold and a cylinder head cover.

7. The engine according to claim 6, wherein a bent portion is provided on the gasket extension portion bending away from the cylinder head cover, the bent portion overlapping with an end portion of an upper wall of the manifold heat shield cover on the cylinder head cover side.

8. The engine according to claim 7, wherein the bent portion of the gasket extension portion overlaps from above with the end portion of the upper wall of the manifold heat shield cover on the cylinder head cover side.

9. The engine according to claim 7, wherein the bent portion of the gasket extension portion overlaps from below with the end portion of the upper wall of the manifold heat shield cover on the cylinder head cover side.

10. The engine according to claim 6, wherein an air flow space is provided between the exhaust manifold and the manifold heat shield cover such that the exhaust manifold is cooled by the cooling air flow passing through the air flow space.

11. An engine having an exhaust manifold covered by a manifold heat shield cover and an exhaust pipe directed downward from the exhaust manifold, the engine comprising:
 a cooling fan disposed on a front portion of the engine and creating an airflow;
 a first portion of the air flow being arranged to flow within a first air flow space located between the exhaust manifold and the manifold heat shield cover;
 a second portion of the air flow being arranged to flow toward the downward directed exhaust pipe;
 an auxiliary component heat shielding plate extending vertically from the manifold heat shield cover and being located on a back side of the exhaust pipe;
 an auxiliary engine component disposed beneath the manifold heat shield cover and positioned on a back side of the auxiliary component heat shielding plate such that the auxiliary component heat shielding plate is disposed between the back side of the exhaust pipe and a front side of the auxiliary engine component;
 an air flow guide plate positioned between the exhaust pipe and a cylinder block and defining a second air flow space; and
 the air flow guide plate being structured and arranged to direct a portion of the air flow from the cooling fan around a portion of the exhaust pipe, through the second air flow space, and toward the auxiliary engine component so as to provide cooling air to the auxiliary engine component.

12. The engine according to claim 11, wherein a portion of the manifold heat shield cover is connected to gasket extension portion of an exhaust manifold gasket.

13. The engine according to claim 11, wherein the auxiliary component heat shielding plate is configured to block heat release from the exhaust pipe to the auxiliary engine component.

14. The engine according to claim 11, wherein the manifold heat shield cover is configured to block heat release from the exhaust manifold to the auxiliary engine component.

15. The engine according to claim 11, wherein the air flow guide plate defines an inlet space that narrows toward a space located between the exhaust pipe and the cylinder block.

16. The engine according to claim 11, wherein the air flow guide plate has a front edge located in front of the exhaust pipe.

17. An engine having an exhaust manifold covered by a manifold heat shield cover that is spaced from the exhaust manifold and an exhaust pipe directed downward from the exhaust manifold, the engine comprising:

a cooling fan disposed on a front portion of the engine and creating a cooling airflow;

a first portion of the cooling air flow being arranged to flow within a first air flow space located between the exhaust manifold and the manifold heat shield cover spaced from the exhaust manifold;

a second portion of the cooling air flow being arranged to flow toward the downward directed exhaust pipe so as to cool the exhaust pipe;

an auxiliary component heat shielding plate extending down and/or vertically from the manifold heat shield cover and being located on a back side of the exhaust pipe;

an auxiliary engine component disposed beneath the manifold heat shield cover and positioned behind the auxiliary component heat shielding plate such that the auxiliary component heat shielding plate is disposed between the back side of the exhaust pipe and a front side of the auxiliary engine component;

an air flow guide plate arranged to direct a portion of the second portion of the cooling air flow between the air flow guide plate and a cylinder block so as to defining a second air flow space therebetween; and the second air flow space directing cooling air around a side of the exhaust pipe facing the cylinder block and toward the auxiliary engine component, wherein the auxiliary component heat shielding plate and the manifold heat shield cover is configured to block heat release from the pipe and exhaust manifold to the auxiliary engine component.

18. The engine according to claim 17, wherein a portion of the manifold heat shield cover is connected to gasket extension portion of an exhaust manifold gasket.

19. The engine according to claim 17, wherein the air flow guide plate defines an inlet space that narrows toward a space located between the exhaust pipe and the cylinder block.

20. The engine according to claim 17, wherein the air flow guide plate has a front edge located in front of the exhaust pipe.

\* \* \* \* \*